United States Patent
Loshak et al.

(10) Patent No.: US 6,759,090 B2
(45) Date of Patent: Jul. 6, 2004

(54) METHOD FOR IMPROVED ADHESION OF AN OPTICAL COATING TO A POLARIZING FILM

(75) Inventors: Igor Loshak, Redondo Beach, CA (US); Ahmad A. Barzak, Paramount, CA (US); Nancy L. S. Yamasaki, Long Beach, CA (US); Edward A. Beeloo, Torrance, CA (US)

(73) Assignee: Younger Mfg. Co., Torrance, CA (US)

( * ) Notice: Subject to any disclaimer, the term of this patent is extended or adjusted under 35 U.S.C. 154(b) by 372 days.

(21) Appl. No.: 10/037,673

(22) Filed: Jan. 3, 2002

(65) Prior Publication Data

US 2002/0090516 A1 Jul. 11, 2002

Related U.S. Application Data

(63) Continuation-in-part of application No. 09/567,711, filed on May 10, 2000, now Pat. No. 6,413,641, which is a continuation-in-part of application No. 09/475,424, filed on Dec. 29, 1999, now Pat. No. 6,220,703.

(51) Int. Cl.[7] .............................................. B05D 5/06
(52) U.S. Cl. ....................................................... 427/307
(58) Field of Search .......................................... 427/307

(56) References Cited

U.S. PATENT DOCUMENTS

| 3,833,289 | A | 9/1974 | Schuler | 350/155 |
| 3,940,304 | A | 2/1976 | Schuler | 156/245 |
| 4,090,830 | A | 5/1978 | Laliberte | 425/117 |

(List continued on next page.)

FOREIGN PATENT DOCUMENTS

| JP | 47022475 | | 6/1972 |
| JP | 60-141727 | * | 7/1985 |
| JP | 04249146 | | 9/1992 |
| JP | 06096475 | | 4/1994 |
| JP | 07151914 | | 6/1995 |

OTHER PUBLICATIONS

Rodriguez, Ferdinand, "Principles of Polymer Systems," *Hemisphere Publishing Corporation*, Third Edition, pp. 20–27 and 484–487 (1989).

Hollander, A. et al. "The Influence of Vacuum–Ultraviolet Radiation on Poly(ethlene terephthalate)," *Journal of Polymer Science Part A: Polymer Chemistry*, vol. 34, 1511–1516 (1996).

(List continued on next page.)

*Primary Examiner*—Erma Cameron
(74) *Attorney, Agent, or Firm*—Sheppard, Mullin, Richter & Hampton LLP

(57) ABSTRACT

Methods for improved adhesion of an optical coating to a polarizing film incorporated onto an optical-quality plastic construct are disclosed. Preferred methods include treating a surface of the film by mechanical and/or chemical means and applying an optical coating to the treated film for effecting a coated, polarized optical-quality plastic part. Such mechanical and chemical means include exposing the polarizing film to a caustic solution at a concentration greater than or equal to 10%, roughening the surface of the film in a uniform manner, and utilizing plasma exposure to peen the surface and then chemically modify it. A particularly preferred technique involves uniform physical roughening, namely, forming grooves having a substantially uniform direction substantially aligned with the axis of light absorption, exposing this roughened surface to a caustic solution having a concentration of 10% or greater, and then dipping the roughened surface into an overcoat solution and withdrawing it substantially perpendicular to the direction of the grooves.

17 Claims, 3 Drawing Sheets

U.S. PATENT DOCUMENTS

| | | | |
|---|---|---|---|
| 4,268,127 A | 5/1981 | Oshima et al. | 350/337 |
| 4,274,717 A | 6/1981 | Davenport | 351/169 |
| 4,418,992 A | 12/1983 | Davenport et al. | 351/169 |
| 4,427,741 A | 1/1984 | Aizawa et al. | 428/332 |
| 4,611,892 A | 9/1986 | Kawashima et al. | 351/159 |
| 4,617,207 A | 10/1986 | Ueki et al. | 428/1 |
| 4,873,029 A | 10/1989 | Blum | 264/1.3 |
| 5,049,427 A | 9/1991 | Starzewski et al. | 428/40 |
| 5,051,309 A | 9/1991 | Kawaki et al. | 428/332 |
| 5,059,356 A | 10/1991 | Nakamura et al. | 252/585 |
| 5,071,906 A | 12/1991 | Tanaka et al. | 524/557 |
| 5,286,419 A | 2/1994 | van Ligten et al. | 264/1.3 |
| 5,324,566 A | 6/1994 | Ogawa et al. | 428/141 |
| 5,434,707 A | 7/1995 | Dalzell et al. | 359/485 |
| 5,437,894 A | 8/1995 | Ogawa et al. | 427/535 |
| 5,641,372 A | 6/1997 | Okuno | 156/230 |
| 5,702,813 A | 12/1997 | Murata et al. | 428/332 |
| 5,718,849 A | 2/1998 | Maus et al. | 264/2.2 |
| 5,757,459 A | 5/1998 | Bhalakia et al. | 351/168 |
| 5,800,744 A | 9/1998 | Munakata | 264/1.7 |
| 5,808,721 A | 9/1998 | Wood et al. | 351/159 |
| 5,827,614 A | 10/1998 | Bhalakia et al. | 428/411.1 |
| 5,830,578 A | 11/1998 | Ono et al. | 428/446 |
| 5,882,774 A | 3/1999 | Jonza et al. | 428/212 |
| 5,926,310 A | 7/1999 | Tamura et al. | 359/350 |
| 5,965,247 A | 10/1999 | Jonza et al. | 428/212 |
| 5,991,072 A | 11/1999 | Solyntjes et al. | 359/361 |
| 6,096,425 A | 8/2000 | Smith | 428/412 |
| 6,220,703 B1 | 4/2001 | Evans et al. | 351/163 |

OTHER PUBLICATIONS

Plastics Engineering Handbook of the Society of the Plastics Industry, Inc., Third Edition, *Reinhold Publishing Corporation*, New York, pp. 492–493 (1960).

Liston, Edward M., "Plasma Treatment for Improved Bonding: A Review," 35th Sagamore Army Materials Research Conference, pp. 199–218 (1988).

Glocker, David A. et al., "Plasma Sources for Polymer Surface Treatment," *Handbook of Thin Film Process Technology* (1996).

\* cited by examiner

METHOD FOR IMPROVED ADHESION OF AN OPTICAL COATING TO A POLARIZING FILM

CROSS-REFERENCE TO RELATED APPLICATIONS

This is a continuation-in-part of U.S. patent application Ser. No. 09/567,711 filed May 10, 2000, now U.S. Pat. No. 6,413,641 which is a continuation-in-part of U.S. patent application Ser. No. 09/475,424 filed Dec. 29, 1999, now U.S. Pat. No. 6,220,703, each of which is hereby incorporated by reference as if fully set forth herein.

BACKGROUND OF THE INVENTION

The field of the present invention relates to robust polarizing films, such as polyethylene terephthalate (PET) polarizing films, incorporated onto optical-quality plastic parts, such as eyewear, and particularly to improved adhesion of coatings applied to the polarizing films.

As disclosed in the above-identified prior related applications, optical-quality parts may include ophthalmic lenses (semi-finished or finished prescription or non-prescription blanks), lenses, goggles, visors, shields, polarized facemasks or shields, and polarized display devices or windows that require low haze. If polarized, such optical-quality plastic parts may include a number of different types of polarizers on the surface of the optical construct or actually incorporated into the optical construct itself.

Polarizers may include conventionally well-known polyvinylalcohol (PVA) films and the like. As PVA and other typical films are particularly susceptible to heat and other environmental damage, should this type of polarizer film be used on the outside surface of an optical construct, those skilled in the art understand that the polarizer would have to be protected. Such protection is typically in the form of two outside plastic sheets with the polarizer sandwiched thereinbetween, sometimes referred to as a "wafer". In other words, in order to have an optical-quality polarized plastic part where the polarizer is adhered to the outside surface of the optical construct, if the polarizer is a conventional polarizer, the polarizer needs to be in the form of a wafer or the like.

If the polarizer is in the form of a wafer, delamination between the wafer and the construct is of paramount concern, and frequently is the downfall of such conventional optical parts. Alternately, if a strong bond is achieved between the wafer and the construct, further environmental stresses may cause delamination within the wafer itself, separating the needed protective layers from the fragile polarizer. Thus, the bonds between the many layers of the wafer and the construct have usually been the Achilles' heel of conventionally made optical parts. Moreover, as light must travel through a protective plastic sheet before it reaches the polarizing film, birefringence may occur, resulting in a loss of quality of the polarizing properties when compared to the film by itself. And if a coating is used on the wafer, one skilled in the art must be concerned about the delamination of the coating from the wafer as well.

In an effort to solve such typical problems with conventional polarized optical parts, a more "robust," durable, stable polarizer needed to be discovered to replace the conventionally used polarizers that had so many undesirable properties, such as PVA polarizers. As fully disclosed in their related applications, the inventors discovered that PET had many desirable properties, but this robust material was inert and could not be bonded to constructs using conventionally known techniques. Novel bonding techniques to "integrally bond" (interpenetrated bonding or bonding at the molecular level) the PET polarizing film to the optical construct, as well as an optional optical coating, are fully disclosed in the parent applications.

With respect to optical coatings, as set forth in the parent applications, it may be desirable to overcoat the optical parts for increased physical or optical performance. Common overcoats include scratch or abrasion-resistance layers, anti-reflection coatings, mirrored coatings, and anti-fogging layers. These different coatings may be applied to different surfaces (e.g., a scratch resistant coating on one surface, and a tinted or mirror coating on another), depending on the application.

Such coatings may be applied in the liquid state by roll, spin or dip coating, for example. Depending on the chemistry of the coating solution, the liquid film may be converted to a harder, solid layer by thermal, ultraviolet, infrared or other means of irradiation, reactive initiators or other reactive methods. Vacuum-deposited coatings may be applied as an alternate to the liquid coating, or in addition to cured liquid coatings. Such vacuum coatings may provide additional protection from physical wear, environmental degradation, or further control of the optical properties of the part. For instance, the liquid or vacuum deposited coatings may alter light throughput in a particular energy region to give anti-reflective or reflective (mirror) properties, alter the perceived color of the part, or reduce exposure to emissions such as infrared or ultraviolet emissions.

Similar to the bond between the polarizer film and the optical construct, it is again imperative that excellent adhesion between the polarizer film and the overcoat is achieved to ensure product integrity during use, or during post-processing steps such as shaping, grinding, or edging the part. The parent applications disclose treatments that can be used to improve adhesion to subsequent coatings, including certain chemical modifications of the preferred PET polarizing film surface that lead to improved adhesion of subsequent coatings.

Recognizing the consumer market's constant demand for better performance from optical parts, the present inventors have improved upon the technology disclosed in the parent applications. More specifically, the present inventors recognized that further enhancement of adhesion between a robust polarizer, such as the PET film, a polyester film or the like, and an optical coating is not only desired but put perhaps critical to preventing failure under extreme conditions such as prolonged exposure to the sun (e.g., leaving your sunglasses on the dashboard) or other such similar abuse.

In an effort to meet the demand for constantly better performance, the present inventors used more aggressive treatments on polarizing films to further enhance the bond between the film and subsequent coatings. In doing so, however, the inventors discovered that more aggressive treatments were often accompanied by physical or chemical damage that deleteriously compromised the required optical quality of either the polarizer and/or the optical and physical properties of the resultant part. The inventors particularly found that more aggressive treatments to the preferred robust (and hence more inert) polarizing films, such as PET films, may be deleterious to their sought-after properties (one skilled in the art understands that the surface treatments proposed in the parent applications, let alone the more aggressive treatments referred to here, may destroy the polarizing properties of the more traditional films such as PVA films). Improved adhesion between film and overcoat, leading to enhanced environmental performance, without compromise of optical or physical properties is therefore desired.

SUMMARY OF THE INVENTION

The preferred embodiments relate to methods for improved adhesion of an optical coating to a polarizing film incorporated onto an optical-quality plastic construct comprising treating a surface of the film by mechanical and/or chemical means and applying an optical coating to the treated film for effecting a coated, polarized optical-quality plastic part.

In one aspect of the invention, the treatment may comprise exposing the polarizing film to a caustic solution at a concentration greater than or equal to 10%. In yet another aspect, the treatment may comprise forming grooves having a substantially uniform direction on a surface of the film, dipping the film incorporated onto the construct in a solution comprised of the optical coating, and withdrawing the film in a direction substantially perpendicular to the direction of the grooves.

Another aspect may comprise physically treating a surface of the film by plasma exposure to peen the surface and thereby create a substantially uniform surface roughness, and then chemically treating the substantially uniform surface by plasma exposure.

Such disclosed treatments may be used alone or in combination with another to advantageously effect improved adhesion between the polarizing film and the coating, as well as between subsequent coatings, to thereby enhance environmental performance without compromising the desired optical and physical properties of the film or the resultant optical-quality part.

BRIEF DESCRIPTION OF THE DRAWINGS

The various objects, features, and advantages of the present inventions may be better understood by examining the Detailed Description of the Preferred Embodiments found below, together with the appended figures, wherein:

FIG. 3 shows a treated polarizing film, the surface of which has been randomly roughened to create a non-uniform surface, compared to the uniformed surface illustrated in FIG. 2a.

DETAILED DESCRIPTION OF THE PREFERRED EMBODIMENTS

The preferred embodiments will now be described with respect to the drawings. To facilitate the description, any numeral identifying an element in one figure will represent the same element when used in any other figure.

Figure 1:
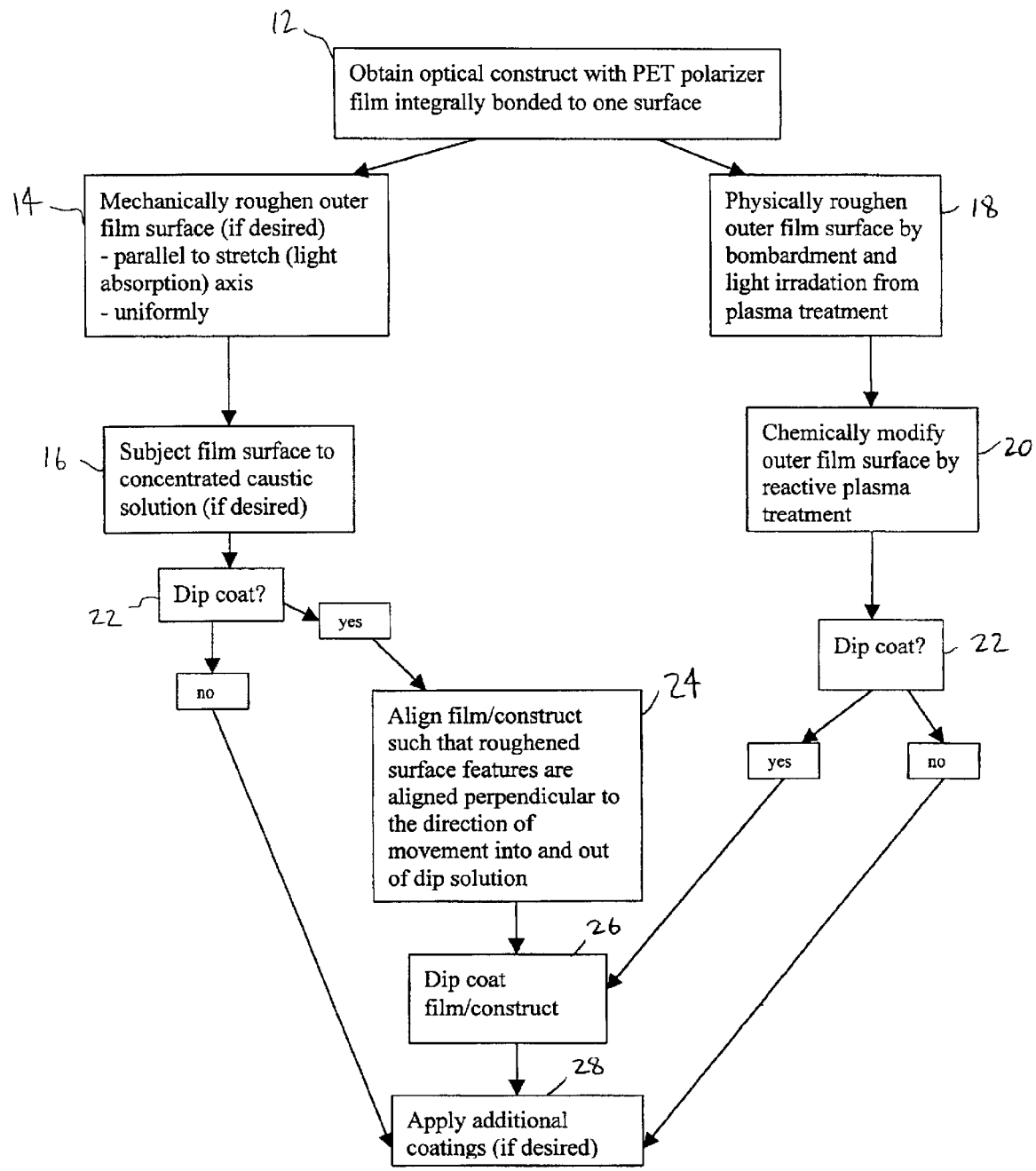
FIG. 1 is a flowchart illustrating a general overview of preferred bonding techniques according to the present invention that effect improved adhesion of an optical coating to a polarizing film to thereby enhance environmental performance of the resultant part.

FIG. 1 is a flowchart illustrating a general overview of bonding techniques according to the preferred embodiments that effect improved adhesion of an optical coating to a polarizing film, as well as improved adhesion between subsequent coatings, leading to an increased environmental performance of the resultant part.

As exemplified in FIG. 1 and disclosed in detail herein, the preferred bonding techniques generally involve treating a surface of the film that has been incorporated onto an optical construct by mechanical and/or chemical means and applying an optical coating to the treated film to create a coated, polarized optical-quality plastic part. Such mechanical and chemical means, as discussed in detail below, may include exposing the polarizing film to a caustic solution at a concentration greater than or equal to 10%, roughening the surface of the film in a uniform manner, and utilizing plasma exposure to peen the surface and then chemically modify it. A particularly preferred technique involves uniform physical roughening, namely, forming grooves having a substantially uniform direction substantially aligned with the axis of light absorption, exposing this roughened surface to a caustic solution having a concentration of 10% or greater, and then dipping the roughened surface into an overcoat solution and withdrawing it substantially perpendicular to the direction of the grooves.

Turning in detail to FIG. 1, the first step in each of the preferred coating methods includes the step of "Obtain optical construct with PET polarizer film integrally bonded to one surface" 12. This step 12 is merely exemplary and should not be understood to be a limitation of this invention as to the particular type of film used or the manner in which the film must be bonded to the optical construct, unless specifically indicated otherwise herein.

In particular, while this step 12 illustrates the material to be coated is "PET polarizing film", the disclosed invention should not be limited to PET polarizing films or even polarizing films. Rather, other types of robust films with various desired optical or mechanical properties may benefit from the disclosed treatment methods. Other robust film materials may include alternate polyalkylene terephthalates (e.g., polybutylene terephthalate, and poly-1,4-cyclohexanedimethlylene terephthalate), polyimides, polymethacrylates, polyacrylates, polyethylene naphthalate (PEN), polyalkylene polymers (e.g., polyethylene, polypropylene, polybutylene, polyisobutylene, and poly(4-methyl)pentene), fluorinated polymers, and chlorinated polymers. PET polarizing film is preferred, as illustrated in FIG. 1, not only because it is a robust (and consequently undesirably inert) film, but also because it is ideally suited to the present methods and applications.

Similarly, while this step 12 illustrates the film is "integrally bonded to one surface" of the optical construct, the invention herein should not be limited to integral bonding. Rather, the film need only be bonded in the generic sense to the outside surface of a construct before the film is coated. "Integral bonding" (interpenetrated bonding or bonding at the molecular level) is of course preferred for optical quality and performance reasons, as fully disclosed in the parent applications. Consequently, such integral bonding is illustrated in FIG. 1 as the starting point for the improved optical coating adhesion techniques disclosed herein.

With each of the embodiments, the preferred PET film should preferably be of very high optical quality to match ophthalmic standards, such as Developmental Film 99–04 distributed by R&S Enterprises of Yokohama, Japan with a polarizing efficiency of at least 96.3% and a transmission average (400–700 nM) of 14–18%. The inventors currently prefer the un-annealed form to the standard annealed form of Developmental Film 99–04 distributed by R&S Enterprises. The PET film may further comprise a crystalline or semi-crystalline naphthalene dicarboxylic acid, such as polyethylene naphthalate polyester or a copolymer derived from ethylene glycol, naphthalene dicarboxylic acid, and some other acids such as terephthalate, as described in U.S. Pat. Nos. 5,882,774 and 6,296,927, which patents are hereby incorporated by reference as if fully set forth herein.

With respect to the optical construct and each of the embodiments disclosed herein, the optical construct may be made out of common optical plastics including thermoplastics, thermosets and hybrid systems such as those used in reactive molding. Preferably, the construct is comprised of thermoplastic materials and more preferably optical-quality polycarbonate (PC) resin such as that sold by Bayer, Inc. of Pittsburgh, Pa. under their trademarks Makrolon® DPI-1821 or 1815, or Lexan® OQ2720 or RL7220 manufactured by General Electric. Other optical-quality thermoplastic materials that may be used to form the construct include polysulfones, polyethersulfones, polyamides, polystyrenes; and mixtures of polycarbonate and polyurethanes, polyesters, polysulfones, polystyrenes, amorphous polyolefins, and acrylics. When the optical construct is comprised of a thermoset plastic, the preferred material is CR-39® manufactured by PPG. Other plastics used to form the construct may include hybrid materials such as polyurea urethanes, thiourethane compounds and halogen-containing polymers.

With each of the disclosed embodiments, since the film has one surface exposed to the atmosphere, it may be desirable to overcoat the part with an abrasion-resistant coating. Such hard coatings may comprise a thermal or ultraviolet (UV) cured hard coat. Ultraviolet hard coats such as SDC-1175 (SDC Coatings, Inc.) for thermoplastic lenses or LTI-SHC-175Y, 33% solids, (Lens Technology I, L.L.C.) typically used for thermoset lenses, can be utilized. More preferably, thermal hard coats such as the hydroxylated organosilane 30% coating solution for polycarbonate (SCL International) may be used. Thermal coats commonly have the advantages of higher abrasion resistance and better compatibility with additional optical coatings (such as mirror or anti-reflectance coatings).

The embodiments disclosed herein comprise treatments that have been found to be particularly successful for improving adhesion of the preferred PET film to hard coatings. The invention, however, need not be so limiting as the disclosed techniques may advantageously be used to improve adhesion of other types of optical coatings such as anti-reflective coatings, mirrored coatings, and anti-fogging layers. Regardless of the materials employed, as a result of the disclosed techniques, there is sustained adhesion of subsequent coatings under extreme environmental conditions such as intense UV exposure, and excessive heat/humidity exposure. This correlates to more assured performance in the extremes of product use, such as active sports in winter and summer conditions, water activities, and extended storage in adverse environments (e.g., direct sun exposure on auto dashboards).

As noted above and illustrated in FIG. 1, once the optical construct with the preferred PET polarizer film integrally bonded to one surface thereof has been obtained at step 12, the next steps involve mechanically and/or chemically modifying the exposed surface of the film to increase adhesion between the film and the subsequently applied coating. In particular, the left-hand side of FIG. 1 respectively illustrates mechanical and chemical modification via physical roughening at step 14 and exposure to a caustic solution at step 16, whereas the right-hand side of FIG. 1 respectively illustrates the use of plasma exposure for mechanical modification at step 18 and chemical modification at step 20.

FIG. 1 demonstrates that different surface treatments or coatings may be necessary to achieve the best adhesion with different materials (e.g., acrylate-based UV coatings or organosilicon-based thermal coatings). The purpose in any such treatment is to enhance bonding, either by physically roughening the surface to create a larger effective surface area for mechanical bonding, or by chemcial modification to increase the number of compatible reactive sites for better bonding properties. Chemical modification of the surface may allow the preferred PET film, which is initially hydrophobic, to react more readily with water or —OH containing compounds, which are often found in coating, primer and adhesive systems. Similarly, chemical modification can be selected to increase the illustrated PET film's low surface energy, which means it will be capable of bonding to a much wider range of materials. Chemical treatment may include both modification of the surface reactivity of the PET film or coating of the PET film with a reactive layer. Regardless of the treatment or coatings employed, the bond that is preferred for the best adhesion is integral bonding, just as is the case between the construct and the film.

As disclosed in the parent applications, the most successful treatment for improved adhesion of hard coatings (either thermally or ultraviolet light cured) to the preferred PET film bonded to optical constructs was exposure to moderate intensities and concentrations of UV light. This resulted in an increase in the relative ratio of oxygen to carbon-containing species on the film's surface, and increased the proportion of doubly bonded oxygen species. Interestingly, driving these ratios further did not improve initial adhesion with subsequent UV hard coats. Hence, the unusual result was that a D bulb, with less UV intensity, gave a better adhesion result than a higher UV intensity H bulb.

While this treatment gave markedly improved initial adhesion, hard coat delaminations were noted in more aggressive environmental testing, especially with thermal coatings. Identification of multiple successful techniques to modify surface physical or chemical properties is desirable for efficient integration with varied production process steps. The parent applications also suggested that a combination of mechanical and chemical modification further enhances adhesion, particularly to subsequent thermal hard coats. Therefore, research continued on additional methods to enhance bonding even when subjected to extreme heat, extended time in boiling water, or ultraviolet/heat/high humidity combinations.

The results of that continued research are reflected in FIG. 1 and described below. In particular, the following two sections respectively set forth test methods employed for adhesion evaluation of that continued research and the treatment methods that were investigated to identify the best techniques for improving adhesion.

I. Test Methods for Adhesion Evaluation

The original two methods to evaluate hard coating adhesion to the PET film of an optical construct as mentioned in the parent applications were expanded through the following tests of increasing difficulty and extremes of performance. If the coating was not removed in a given test, the next test was attempted.

a. Initial Adhesion Test

Cross-hatch score the coated surface with multiple perpendicular cuts that penetrate through the coating into the underlying optical construct, press 3M brand 810 tape firmly over the scored area, and snap-tape test. Examine both tape surface and test part for coating removal or other damage.

b. Boil Tests

Boil coated part for one hour. Perform tape test on previously scored area, and a newly cross-hatched area.

Boil an additional hour and repeat snap-tape tests.

Boil another hour (three hours total) and repeat snap-tape tests.

c. Extreme UV Tests

Cross-hatch score a coated part. Expose to D bulb (Fusion UV Systems) near-UV radiation at a distance of 2.1" in a UV conveyor system for a total of about 75 seconds (five sequential passes at approximately fifteen seconds exposure per pass). Let coated part cool to room temperature. Perform tape test on previously scored area, and a newly cross-hatched area.

d. Roof Test

Cross-hatch score a coated part. Place on rooftop in industrial area (southern California (Torrance)). Snap-tape test at two to three day intervals starting after five days of exposure.

Successful survival of at least sixteen days exposure to heat, humidity (fog, rain), direct sun, and airborne pollutants has been inferentially correlated to good environmental performance over the average three-year lifetime of eyewear lenses.

e. QUV Test

Commercially available accelerated weathering units such as those available from Atlas Electric Devices, Inc. (Chicago, Ill.) and Q-Panel Lab Products (Cleveland, Ohio) hold samples at elevated temperatures while cycling between exposure to discrete wavelengths of UV/visible light, or high humidity. Typical cycles run four to eight hours under each condition, and samples are normally checked for damage at intervals of one to three days over a total of five to twenty days, depending on the likely exposure of the test sample in actual use. Our test protocol was five days exposure, with parts evaluated daily for visible degradation, and for acceptable results in the cross-hatch snap-tape test.

The manufacturers point out that results obtained with the accelerated weathering units should be correlated with actual outdoor exposure for most accurate interpretation of the accelerated versus true lifetime performance. Since the inventors had already established a history of likely lifetime performance based on the direct weathering (roof) tests, more emphasis was placed on the samples' performance in the roof tests than in these first-time results.

II. Treatment Methods Investigated for Improved Adhesion

The preferred treatment disclosed in the parent applications gave good results in the first two tests with only minimal damage, or no damage, after the one-hour boil adhesion test. This satisfied the original expectations for adhesion, but new product requirements necessitated further improvements. Particularly, roof weathering tests showed adhesion failure of cross-hatched parts in less than five days. This would be unacceptable environmental performance for eyewear. In addition, requirements for better abrasion resistance and compatibility with subsequent coatings lead to increased emphasis on thermal hard coats.

Therefore, various surface treatments were tried in combination with UV light irradiation prior to standard thermal dip coating techniques for coating a lens itself. That dip coating process includes a four-minute soak in an 40° C. ultrasonic bath containing 3.5% NaOH in deionized water. The part is then passed through a detergent bath, rinsed with deionized water, dried, then dipped into and removed from the coating solution at a controlled speed. The coating is cured in an oven at 120° C. for two hours.

A wide range of organic and halogenated organic solvents were explored as a complementary treatment to the UV exposure for enhanced adhesion of the thermal hard coating. None resulted in significantly better adhesion than previously measured. In addition, it was recognized that while UV pre-treatment is a highly complementary process to subsequent UV coating, it can require entirely different hardware and processing than thermal coating methods. Therefore, alternate initial treatment methods were explored.

As indicated above, the thermal hard coating process itself includes certain pre-cleaning treatment steps including exposure to moderate caustic and detergent washes. These alone were not sufficient modification of the PET surface to reliably achieve even initial thermal hard coat adhesion. The following are some examples of additional treatments investigated:

| | Treatment prior to thermal coating process | Result |
|---|---|---|
| 1. | Wipe film incorporated onto a lens with isopropanol immediately before coating | Fails primary adhesion |
| 2. | Raise temperature of soak and rinse tanks to 60° C. | Fails primary adhesion |
| 3. | Soak in ultrasonic bath 6 minutes instead of 4 minutes | Fails primary adhesion |
| 4. | Wipe film incorporated onto a lens with methanol immediately before coating | PASSES primary adhesion/ Fails 1 hour boil |
| 5. | Mechanically clean film incorporated onto a lens with CR-Scrub ™ mixture (metal oxides in surfactant/detergent mix) and methanol | PASSES primary adhesion/ PASSES 1 hour boil |
| 6. | Mechanically clean lens with CR-Scrub ™ mixture without methanol | PASSES primary adhesion/ PASSES 1 hour boil |

While the CR-Scrub™ abrasive thus gave an improvement in adhesion, the mechanical roughening associated with this treatment is detrimental to final cosmetics and optical performance. The following summary of experiments illustrates this difficulty. Each of these experiments resulted in a coated lens that passed initial adhesion and one-hour boil tests, but the cosmetic properties differed.

| | Treatment method | Result |
|---|---|---|
| 1. | Add detergent to CR-Scrub ™ mixture | Scratches visible through coating |
| 2. | Mechanically clean with CR-Scrub ™ mixture and methanol, and apply approximately 15% thicker thermal coat | Scratches visible through coating |
| 3. | Rub lightly with CR-Scrub ™ mixture; apply approximately 15% thicker coat | Scratches visible through coating |
| 4. | Rub lightly with CR-Scrub ™ mixture; increase coating thickness to approximately 30% thicker coat | Scratches visible through coating |
| 5. | Apply CR-Scrub ™ mixture to lab wipe; rub lightly by hand in circular motion | Scratches visible through coating |
| 6. | Apply CR-Scrub ™ mixture to motorized, circularly rotating sponge, press lens lightly against sponge to scrub | Scratches visible through coating |
| 7. | Repeat 6, but nearly double the coating thickness | Scratches visible through coating |
| 8. | Apply CR-Scrub ™ mixture with sponge, but linear motion of sponge across top of lens | Scratches visible through coating, but less pronounced |

If the lens was abraded even more lightly, or with a diluted mixture of the CR-Scrub™ agent, coating adhesion failed. If scrubbed more vigorously, the wet chemical coating could not cover the scratch marks on the surface, even at increased coating thickness. Therefore, a specialized method of applying the CR-Scrub™ mixture was invented.

As set forth below, the specialized method for enhanced coating adhesion without cosmetic and optical degradation involves consistent and sufficient pressure applied over the entire curved optical part, and directional uniformity of the mechanical action.

First, the polarized optical parts are often shaped into simple or complex curves such as lenses, visors and goggles. If the mechanical surface change is not uniform over this curved surface, spotty delamination or variable adhesion of subsequent coating often occurs. Therefore, a fixture was devised to accurately position the part relative to a deformable and rotating applicator for the CR-Scrub™ mixture. The height of this fixture is adjustable to accommodate different thicknesses of parts. Preferably, the system is also designed to accommodate different curvatures of parts by curving the applicator to match the curve of the optical part, or adjusting the height and angle of the fixture supporting the optical part. In another refinement, the system will maintain a constant distance or pressure between the actual surface of the part and the scrubbing applicator, rather than an average value. For example, one could use active load with a feedback pressure sensor to maintain a constant pressure upon the applicator. The applicator could also be mounted on an xyz adjustable fixture or gimbal, to adapt to the shape of the optical part's surface.

It is similarly important that a consistent amount of the roughening agent is present at any time, via controlled delivery of the liquid scrubbing mixture. One method employed to accomplish this is a peristaltic pumping system that feeds the scrubbing mixture at a controlled rate onto the applicator.

Figure 2A:
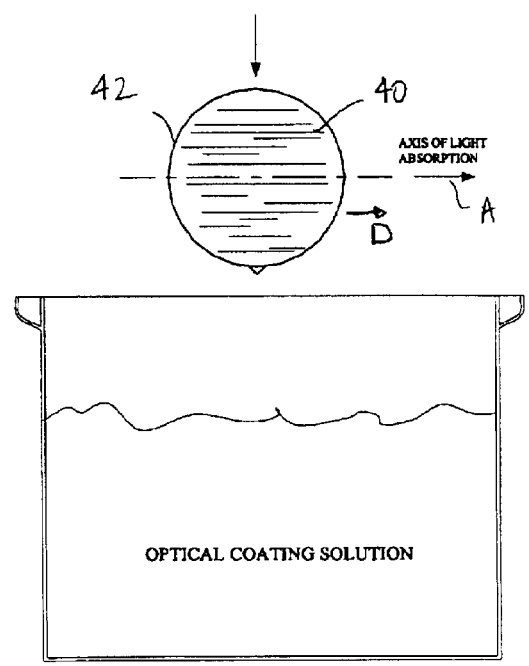
FIGS. 2a and 2b illustrate a preferred application technique for coating a polarizing film incorporated onto an optical construct.
Figure 2B:
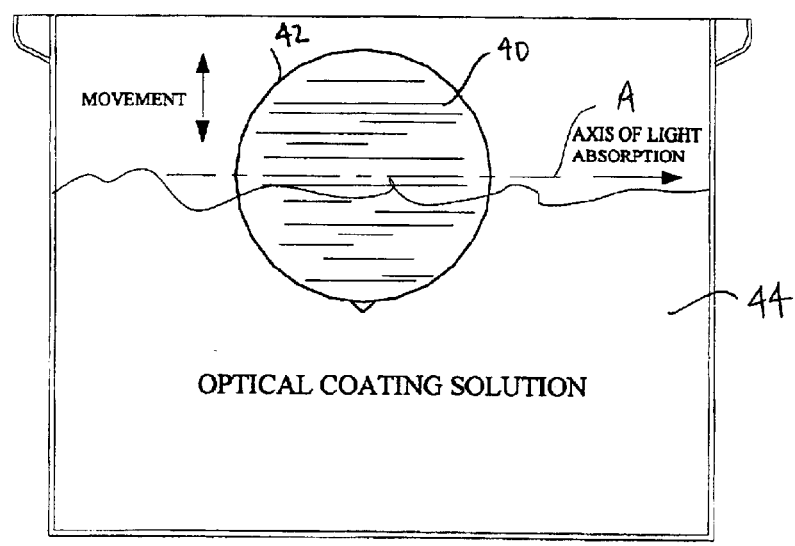
Figure 3:
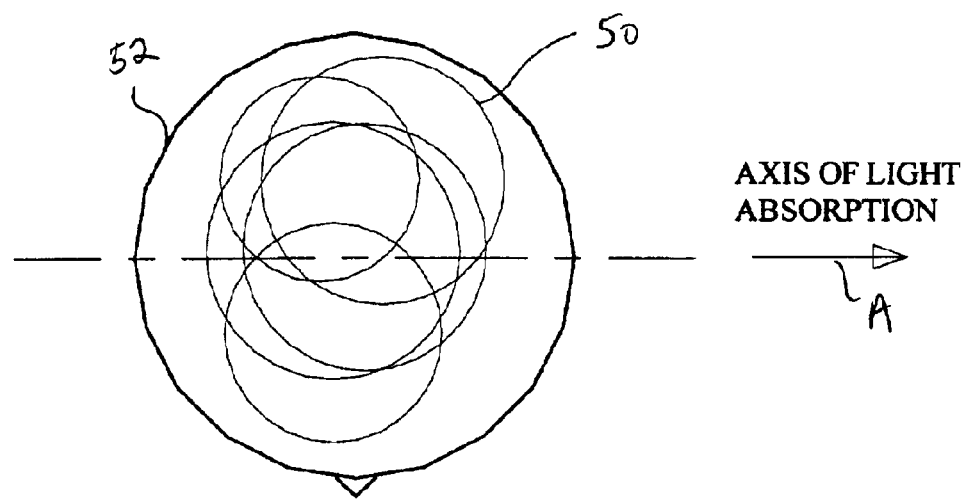

Secondly, with a dip coating system as commonly used with thermal hard coats, sol-gel coatings and other optical overcoats, it was found that even fine surface roughening may not be filled in by the subsequent coating, but created flow lines of thickness inhomogeneity. If these marks were random (see random marks 50 on the film 52 incorporated onto a lens (not shown) as illustrated in FIG. 3), unacceptable cosmetic and optical damage occurred, because the marks show through the coating, even with significantly increased coating thickness. If the marks are oriented in the direction of withdrawal, one might assume excess coating could flow down the surface and be evenly removed. However, it was found instead that these parallel marks were still unacceptably visible through the coating. Interestingly, when the mechanical roughening was evenly controlled (see grooves 40 on the film 42 incorporated onto a lens (not shown) as illustrated in FIG. 2a and at step 14 in FIG. 1) and perpendicular to the direction of withdrawal from the coating solution 44 (see FIG. 2b and steps 24 and 26), the coating uniformly wet the surface and provided a final coated part with a smooth, optical-quality surface. This was unexpected because one might assume that the perpendicular scratches would trap coating like a staircase pattern across the part, especially on highly curved lenses; instead, the best results were obtained with this perpendicular, uniform surface roughening of the film surface of the optical parts. Once steps 14, 22, 24, and 26 have been completed, additional coatings may be applied if desired as shown in FIG. 1 at step 28.

Figure 4:
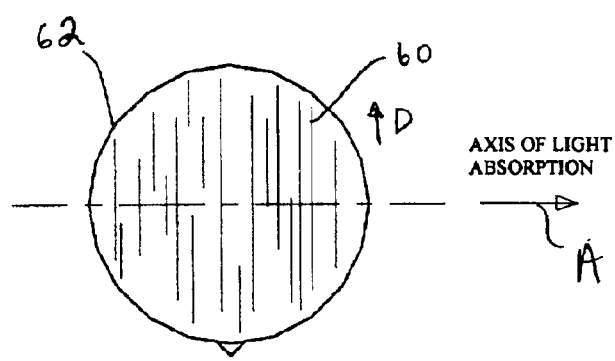
FIG. 4 illustrates a polarizing film that has been physically treated so as to create a uniform surface like that of FIG. 2a, but one in which the exemplary disclosed grooves are not substantially aligned in the stretch direction (axis of light absorption) of the polarizing film.

Additionally, in creating the PET polarizer, the film is stretched preferentially in the axis of polarized light absorption (A), as shown in FIGS. 2a, 2b, 3, and 4. Unexpectedly, the inventors found that if the film was roughened uniformly but perpendicular to the stretch axis as shown in FIG. 4 (illustrating uniform grooves 60 have a substantially uniform direction D on film 62), the fine scratches on the film's surface were not covered by subsequent coating, even when these scratches were then positioned in the preferred oreintation perpendicular to the withdrawal direction. However, when uniform grooves or scratches were oriented with the stretch direction (axis of light absorption A) (see FIG. 2a illustrating uniform grooves 40 having a substantially uniform direction D aligned with axis direction A), the same coating thickness gave good optical-quality parts, without evidence of underlying scratch marks.

It is possible that a directionally stretched film may exhibit different properties or behavior in the stretch direction or perpendicular to this direction, due to alignment of polymer chains and other physical and chemical effects. The inventors have noted with the PET film that relaxation of the film occurs preferentially along the stretch axis. Since such relaxation can be accompanied by a change in effective surface area, this may play an active role in both subsequent adhesion (buckling away from a coating), and in retention of physical scratches on the surface. Hence for the PET polarizer, it is preferable to roughen the film surface uniformly (step 14; see also step 18) and parallel to the stretch axis, as illustrated in FIGS. 2a and 2b.

The inventors found that mechanical roughening of the PET film surface alone (step 14 as shown in FIG. 1) did not achieve optimal adhesion of subsequent hard coating. Additional use of the CR-Scrub™ mixture, followed with a solvent wipe or soaks (even overnight) did not improve adhesion to the required levels. Interestingly, treating with UV as in the parent applications after the initial mechanical roughening disclosed herein caused so much surface modification that the PET film was physically and optically damaged during the coating process and primary adhesion failed. This illustrates that if a fairly narrow range of process conditions is exceeded, it can cause irreparable damage to the product.

The inventors found, however, that with uniform mechanical treatment via the CR-Scrub™ abrasive prior to thermal coating (see step 14 shown in FIG. 1), the optical parts survive the three-hour boil test, and five days of roof exposure. Unexpectedly, the inventors found that if they increased the caustic concentration in the subsequent soak prior to coating, adhesion and resistance to environmental damage also increased (step 16 shown in FIG. 1). This is particularly unexpected because while mild caustic solutions are often used to clean parts, it is well known that 10% NaOH solutions are routinely used to remove coatings. Thus increased concentrations could easily be expected to be detrimental to coating adhesion by producing a weak and easily attacked interfacial layer.

The results shown in the table below illustrate the successful and unusual adhesion improvements in combining this form of mechanical and chemical modification.

TABLE

Effect of caustic soak concentration on hard coat adhesion
(after mechanical roughening of PET surface of optical construct)

| NaOH concentration: | 3.5% | 7% | 10% | 15% | 20% | 30% |
|---|---|---|---|---|---|---|
| Primary tape adhesion test | pass | pass | pass | pass | pass | pass |
| Boil (hours) adhesion test | 3 | 3 | 3 | 3 | 3 | 3 |
| Roof (days) adhesion test | 5 | 7 | 12 | 14 | 17+ | 17+ |
| 5× UV adhesion test | pass | pass | pass | pass | pass | pass |
| QUV (days) adhesion test | 1 | 1 | 1 | 2 | 3 | — |

The inventors also investigated the effect of treating an optical part with PET on its surface with only a concentrated caustic solution having a concentration of 10% or greater (see step 16 shown in FIG. 1). When subjected to 15% NaOH ultrasonic soak for four minutes before thermal hard coating (steps 22 and 26, FIG. 1), the part passed initial coating adhesion without any other pre-treatment (such as UV or physical roughening). However, the part failed the one-hour boil adhesion test. Hence a concentrated caustic soak can certainly enhance adhesion on the inert PET surface and may be a sufficient pre-treatment for acceptable performance in some applications. For more demanding environmental durability, the combination of physical and chemical treatment gives improved robustness to the coated optical part.

The above illustrates various examples of combinations of mechanical and chemical modifications of the inert PET surface resulting in significantly improved adhesion. Such methods alone increased adhesion but were found to be insufficient to assure consistent and continued bonding under extremely demanding conditions that can disrupt fragile interlayers.

As shown in FIG. 1, other techniques for improved adhesion may include the use of plasma treatments or plasma exposure (see steps 18 and 20). Plasma treatments embody low and high pressure gas processes that emit light and contain neutral, charged, activated and excited atomic or molecular species. This may include exposure to corona, glow discharge, partial discharge, and afterglow conditions as well as treatment with conventional plasmas. For example, plasmas or coronas of inert or heavy gases (such as argon or nitrogen) can be used effectively to roughen a surface on a molecular layer (see FIG. 1, step 18). This can be likened to peening the surface at a molecular level, and can significantly increase the effective available surface area for physical adhesion of subsequent coatings. This fine peening will provide an uniform texturing of the surface, and therefore should not result in any residual evidence of roughness through subsequent wet chemical coatings.

Subsequent exposure of the surface to other chemically active gases (organosilicones, organics, oxidizers, reducing agents, etc.) may then result in appropriate chemical modification for enhanced bonding of desired coatings (see FIG. 1, step 20). Hence one may first subject the part to a heavy or inert gas plasma treatment (step 18), then switch gases to a reactive gas or gas mixture that modifies the surface chemistry such that more species are available for subsequent chemical bonding (step 20). Since both these methods could use the same equipment to excite and maintain a plasma or corona, their combination represents a practical alternate way to effect physical and chemical conditioning of a surface for subsequent overcoating.

Similarly, an intermediate wet chemical layer, such as polyurethanes, epoxies, acrylates, or other compounds with reactive species may be deposited over a physically roughened surface for improved adhesion to additional hard coats or other protective or optical coatings. Such an intermediate layer may not only provide reactive sites for integrally bonding to both the PET and the subsequent coatings, but may act as a material "buffer" layer between these potentially very dissimilar materials. These intermediate layers can therefore be designed to provide, for example, stress relief, refractive index matching, greater chemical stability or resistance, impact cushioning, or other chemical and mechanical attributes beneficial to the entire optical construct.

While preferred embodiments and specific examples are disclosed herein, many variations are possible which remain within the concept and scope of the invention. Such variations would become clear to one of ordinary skill in the art after inspection of the specification and drawings herein. The inventions therefore are not to be restricted except within the spirit and scope of the appended claims.

What is claimed is:

1. A method for improved adhesion of an optical coating to a polarizing film incorporated onto an optical-quality plastic construct comprising:
    forming grooves having a substantially uniform direction on a surface of the film;
    dipping the film incorporated onto the construct in a solution comprised of the optical coating; and
    withdrawing the film in a direction substantially perpendicular to the direction of the grooves.

2. A method for improved adhesion according to claim 1, wherein the grooves are substantially uniform.

3. A method for improved adhesion according to claim 2, wherein the substantially uniform grooves are fanned by consistent pressure applied over substantially all of the surface of the film.

4. A method for improved adhesion according to claim 1, wherein the polarizing film has a stretch direction, and wherein the grooves are substantially aligned with the stretch direction.

5. A method for improved adhesion according to claim 1, further comprising exposing the polarizing film to a caustic solution to teat the film before the step of dipping the film incorporated onto the construct in a solution comprised of the optical coating.

6. A method for improved adhesion according to claim 5, wherein the caustic solution has a concentration greater than or equal to 10%.

7. A method for improved adhesion according to claim 6, wherein the caustic solution has a concentration in the range of approximately 10% to 30%.

8. A method for improved adhesion according to claim 1, further comprising the step of applying an additional optical coating onto the applied coating.

9. A method for improved adhesion according to claim 1, wherein the optical-quality plastic part is selected from the group consisting of ophthalmic lenses, lenses, goggles, visors, shields, facemasks, polarized display devices, and windows that require low haze.

10. A method for improved adhesion according to claim 1, wherein the polarizing film is comprised of polyethylene terephthalate.

11. A method for improved adhesion according to claim 10, wherein the film is further comprised of a crystalline or semi-crystalline naphthalene dicarboxylic acid polyester.

12. A method for improved adhesion according to claim 1, wherein the optical coating is comprised of a thermal cured hard coat.

13. A method for improved adhesion according to claim 1, wherein the optical coating enhances the optical properties of the plastic part.

14. A method for improved adhesion according to claim 1, wherein the optical coating enhances the mechanical properties of the plastic part.

15. A method for improved adhesion according to claim 1, wherein the optical-quality plastic construct is comprised of a thermoplastic material.

16. A method for improved adhesion according to claim 1, wherein the optical coating is selected from the group consisting of a thermal or ultraviolet cured hard coat, an anti-reflection coating, a mirrored coating, and an anti-fogging coating.

17. A method for improved adhesion according to claim 1, wherein the optical coating integrally bonds to the film after the step of applying an optical coating to the treated film.

* * * * *

UNITED STATES PATENT AND TRADEMARK OFFICE
CERTIFICATE OF CORRECTION

PATENT NO. : 6,759,090 B2
APPLICATION NO. : 10/037673
DATED : July 6, 2004
INVENTOR(S) : Loshak et al.

It is certified that error appears in the above-identified patent and that said Letters Patent is hereby corrected as shown below:

At column 4, line 66, "nM" should be -- nm --.
At column 5, line 17, "DPI-1821" should be --DPI-i 821 --.
        , line 17, "OQ2720" should be -- 0Q2720 --.
At column 6, line 10, "Chemcial" should be -- chemical --.
At column 7, line 27, "I1L" should be -- IL --.
        , line 27, "Ohio" should be -- OH --.
At column 12, line 22, "teat" should be -- treat --.

Signed and Sealed this

First Day of May, 2007

JON W. DUDAS
*Director of the United States Patent and Trademark Office*